US007724292B2

(12) United States Patent
Ueno et al.

(10) Patent No.: US 7,724,292 B2
(45) Date of Patent: May 25, 2010

(54) COLOR FILTER ARRAY FOR A CMOS SENSOR FOR GENERATING A COLOR SIGNAL IN AN IMAGE PICKUP APPARATUS

(75) Inventors: Isamu Ueno, Hadano (JP); Shigetoshi Sugawa, Atsugi (JP); Katsuhisa Ogawa, Tokyo (JP); Toru Koizumi, Yokohama (JP); Tetsunobu Kochi, Hiratsuka (JP); Katsuhito Sakurai, Tokyo (JP); Hiroki Hiyama, Atsugi (JP)

(73) Assignee: Canon Kabushiki Kaisha, Tokyo (JP)

( * ) Notice: Subject to any disclaimer, the term of this patent is extended or adjusted under 35 U.S.C. 154(b) by 782 days.

(21) Appl. No.: 11/473,024

(22) Filed: Jun. 23, 2006

(65) Prior Publication Data
US 2007/0013796 A1 Jan. 18, 2007

Related U.S. Application Data

(62) Division of application No. 09/236,350, filed on Jan. 25, 1999, now abandoned.

(30) Foreign Application Priority Data
Jan. 30, 1998 (JP) ................... 10-018813

(51) Int. Cl.
*H04N 5/335* (2006.01)
(52) U.S. Cl. .................. 348/273; 348/271; 348/272; 348/279; 348/266
(58) Field of Classification Search ................ 348/266, 348/271–279
See application file for complete search history.

(56) References Cited

U.S. PATENT DOCUMENTS

| 4,245,241 A | 1/1981 | Sato et al. ................. 348/279 |
| 4,246,601 A | 1/1981 | Sato et al. ................. 348/277 |
| 4,835,404 A | 5/1989 | Sugawa et al. .............. 250/578 |
| 4,879,470 A | 11/1989 | Sugawa et al. .............. 250/578 |
| 4,967,067 A | 10/1990 | Hashimoto et al. ........ 250/208.1 |
| 5,162,912 A | 11/1992 | Ueno et al. ............. 358/213.16 |
| 5,184,006 A | 2/1993 | Ueno ...................... 250/208.1 |
| RE34,309 E | 7/1993 | Tanaka et al. .......... 358/213.31 |
| 5,262,870 A | 11/1993 | Nakamura et al. .......... 358/212 |
| 5,278,660 A | 1/1994 | Sugiki ........................ 348/305 |
| 5,539,196 A | 7/1996 | Miyawaki et al. ........ 250/208.1 |
| 5,541,648 A | 7/1996 | Udagawa et al. ............ 348/222 |
| 5,583,568 A | 12/1996 | Suga et al. .................. 348/234 |
| 5,652,620 A | 7/1997 | Sugiura et al. .............. 348/236 |
| 5,693,932 A | 12/1997 | Ueno et al. .............. 250/208.1 |
| 5,714,752 A | 2/1998 | Ueno et al. .............. 250/208.1 |

(Continued)

FOREIGN PATENT DOCUMENTS

JP  09-312848 A  12/1997

(Continued)

*Primary Examiner*—Jason Chan
*Assistant Examiner*—Usman Khan
(74) *Attorney, Agent, or Firm*—Fitzpatrick, Cella, Harper & Scinto

(57) ABSTRACT

An image pickup apparatus having a plurality of pixels; and a color filter array of four colors disposed on the plurality of pixels, wherein the color filter away has a periodicity of two rows×two columns, and colors of four color filters in a periodical unit of two rows×two columns are all different.

3 Claims, 8 Drawing Sheets

U.S. PATENT DOCUMENTS

| | | | |
|---|---|---|---|
| 5,737,017 A | 4/1998 | Udagawa | 348/277 |
| 5,907,355 A * | 5/1999 | Kotaki | 348/273 |
| 6,002,287 A | 12/1999 | Ueno | 327/307 |
| 6,034,724 A | 3/2000 | Nakamura | 348/241 |
| 6,118,115 A | 9/2000 | Kozuka et al. | 250/208.1 |
| 6,130,712 A | 10/2000 | Miyazaki et al. | 348/243 |
| 6,133,953 A | 10/2000 | Okada | 348/272 |
| 6,323,901 B1 * | 11/2001 | Ukita | 348/273 |
| 6,330,029 B1 * | 12/2001 | Hamilton et al. | 348/272 |
| 6,388,706 B1 | 5/2002 | Takizawa et al. | 348/273 |
| 6,493,025 B1 * | 12/2002 | Kiriyama et al. | 348/207.1 |
| 6,529,239 B1 | 3/2003 | Dyck | 348/279 |
| 6,559,886 B1 | 5/2003 | Miyahara | 348/273 |
| 6,628,718 B1 | 9/2003 | Niwamoto | 375/240.23 |
| 6,633,334 B1 | 10/2003 | Sakurai et al. | 348/308 |
| 6,650,369 B2 | 11/2003 | Koizumi | 348/301 |
| 6,657,664 B2 | 12/2003 | Ueno | 348/302 |
| 6,757,016 B1 | 6/2004 | Ueno et al. | 348/279 |
| 6,963,372 B1 | 11/2005 | Hiyama | 348/302 |
| 6,980,243 B2 | 12/2005 | Miyawaki et al. | 348/302 |
| 6,992,714 B1 * | 1/2006 | Hashimoto et al. | 348/273 |
| 2002/0012052 A1 | 1/2002 | Nagano | 348/228 |

FOREIGN PATENT DOCUMENTS

| | | |
|---|---|---|
| JP | 11-196427 | 7/1999 |

\* cited by examiner

FIG. 1
PRIOR ART

|    | C1 | C2 | C3 | C4 |
|----|----|----|----|----|
| R1 | Cy | Ye | Cy | Ye |
| R2 | Mg | G  | Mg | G  |
| R3 | Cy | Ye | Cy | Ye |
| R4 | G  | Mg | G  | Mg |
| R5 | Cy | Ye | Cy | Ye |

FIG. 2
PRIOR ART

|    | C1 | C2 |
|----|----|----|
| R1 | Cy | Ye |
| R2 | Mg | G  |
| R3 | Cy | Ye |
| R4 | Mg | G  |
| R5 | Cy | Ye |
| R6 | G  | Mg |
| R7 | Cy | Ye |
| R8 | G  | Mg |

FIG. 3

| G  | Ye |
|----|----|
| Cy | Mg |

FIG. 4

| G1  | Ye1 | G2  | Ye2 |
|-----|-----|-----|-----|
| Cy1 | Mg1 | Cy2 | Mg2 |
| G3  | Ye3 | G4  | Ye4 |
| Cy3 | Mg3 | Cy4 | Mg4 |

COLOR FILTER ARRAY FOR A CMOS SENSOR FOR GENERATING A COLOR SIGNAL IN AN IMAGE PICKUP APPARATUS

CROSS REFERENCE TO RELATED APPLICATIONS

This application is a division of application Ser. No. 09/236,350, filed Jan. 25, 1999, now abandoned.

BACKGROUND OF THE INVENTION

1. Field of the Invention

The present invention relates to an image pickup apparatus for generating a color image signal from light incident from a color filter array, to an image signal read method of reading an image signal from the image pickup apparatus, to a computer process method of generating an image signal, to a computer readable storage medium storing programs, to a processing apparatus for obtaining an image signal, and to an image pickup system including the image pickup apparatus and the processing apparatus.

2. Related Background Art

In order to obtain a color image signal in an image pickup apparatus, light is incident upon image pickup elements via a color filter. The color filter includes a primary color filter and a complementary color filter. The primary color filter has three colors, red, green, and blue, whereas the complementary color filter has four colors, cyan, yellow, magenta, and green. A cyan color filter intercepts only red color in the visible light range, a yellow color filter intercepts only blue color in the visible light range, a magenta color filter intercepts only green color in the visible light range, and a green color filter transmits only green light.

In the case of complementary color filters, a luminance signal Y is given by:

$$Y = Ye + G + Cy + Mg \quad (1),$$

a blue color difference signal is given by:

$$CB = (G + Ye) - (Mg + Cy) \quad (2),$$

and a red color difference signal is given by:

$$CR = (Cy + G) - (Ye + Mg) \quad (3)$$

wherein Cy is a signal picked up by image pickup elements via cyan color filters, Ye is a signal picked up by image pickup elements via the yellow color filters, Mg is a signal picked up by image pickup elements via magenta color filters, and G is a signal picked up by image pickup elements via green color filters.

FIG. 1 shows a pattern of color filters according to a first conventional example. This pattern has a periodicity of two pixels in the horizontal direction and four pixels in the vertical direction. With this color filter pattern, the luminance signal Y can be obtained through the equation (1) by using Cy, Ye, Mg, and G in a block of 2×2 pixels, two pixels in the horizontal direction and two pixels in the vertical direction. Similarly the blue and red color difference signals CB and CR can be obtained through the equations (2) and (3) by using Cy, Ye, Mg, and G in the block of 2×2 pixels.

FIG. 2 shows a pattern of color filters according to a second conventional example. This pattern has a periodicity of two pixels in the horizontal direction and four pixels in the vertical direction. With this color filter pattern, the luminance signal Y can be obtained through the equation (1) by using Cy, Ye, Mg, and G in a block of 2×2 pixels, two pixels in the horizontal direction and two pixels in the vertical direction. Similarly the blue and red color difference signals CB and CR can be obtained through the equations (2) and (3) by using Cy, Ye, Mg, and G in the block of 2×2 pixels.

A digital still camera with an image pickup apparatus reads an image at high speed with a sacrifice of resolution before an image is photographed. In accordance with the image signal read at high speed, an image is displayed in a finder such as a liquid crystal finder, an iris is adjusted, a white balance is adjusted, or other preliminary operations are performed. However, with a combination of the color filter layout shown in FIG. 1 and a conventional image pickup apparatus CCD, even if the pixel signal is read at high speed with a sacrifice of resolution by thinning every second pixel in the vertical direction, for example, only cyan and yellow signals are obtained so that the while balance cannot be adjusted in accordance with outputs of the image pickup elements.

Also with the combination of the color filter layout shown in FIG. 1 and a conventional image pickup apparatus CCD, data of two adjacent pixels in the vertical direction is added and thereafter transferred in the image pickup apparatus and output therefrom. Therefore, paired image data is output from the image pickup apparatus. More specifically, referring to FIG. 1, a pair of data of pixels (C1, R1) and (C1, R2) is output, then a pair of data of pixels (C2, R1) and (C2, R2) is output, then pairs of data of column pixels in the rows R1 and R2 are sequentially output. Next, a pair of data of pixels (C1, R3) and (C1, R4) is output, then a pair of data of pixels (C2, R3) and (C2, R4) is output, then pairs of data of column pixels in the rows R3 and R4 are sequentially output. Since these outputs are used, the calculation of the equation (2) can be made, for example, for the rows R1 and R2, but it cannot be made for the rows R3 and R4. Similarly, the calculation of the equation (3) can be made, for example, for the rows R3 and R4, but it cannot be made for the rows R1 and R2. Therefore, the color difference signal for each color can be obtained only from one row among the four rows of image pickup elements so that the resolution of the color difference signal lowers in the vertical direction.

With the combination of the color filter layout shown in FIG. 2 and a conventional image pickup apparatus CCD, a signal read in a high speed read mode can be used for adjusting the white balance.

With the combination of the color filter layout shown in FIG. 2 and a conventional image pickup apparatus CCD, data of two adjacent pixels in the vertical direction is added and thereafter transferred in the image pickup apparatus and output therefrom. Therefore, paired image data is output from the image pickup apparatus. More specifically, referring to FIG. 2, a pair of data of pixels (C1, R1) and (C1, R2) is output, then a pair of data of pixels (C2, R1) and (C2, R2) is output, then pairs of data of column pixels in the rows R1 and R2 are sequentially output. Next, a pair of data of pixels (C1, R3) and (C1, R4) is output, then a pair of data of pixels (C2, R3) and (C2, R4) is output, then pairs of data of column pixels in the rows R3 and R4 are sequentially output. Since these outputs are used, the calculation of the equation (2) can be made, for example, for the rows R1, R2, R3, and R4, but it cannot be made for the rows R5, R6, R7, and R8. Similarly, the calculation of the equation (3) can be made, for example, for the rows R5, R6, R7, and R8, but it cannot be made for the rows R1, R2, R3, and R4. Therefore, the color difference signal for each color can be obtained only from two rows among the eight rows of image pickup elements so that the resolution of the color difference signal lowers in the vertical direction.

SUMMARY OF THE INVENTION

It is an object of the present invention to obtain an image signal having a high resolution both in the horizontal and vertical directions.

It is another object of the present invention to provide a multi-mode such as a mode of outputting an image signal at high speed which signal can be used for simple color display, autofocus, white balance adjustment and a mode of outputting an image signal having a high resolution.

In order to achieve the above objects, an image pickup apparatus according to an embodiment of the invention comprises: a plurality of pixels; a color filter array of four colors disposed on the plurality of pixels, wherein said color filter array has a periodicity of two rows×two columns, and colors of four color filters in a periodical unit of two rows×two columns are all different from each other.

An image pickup apparatus according to another embodiment of the invention comprises: a plurality of pixels; a color filter array of four colors disposed on the plurality of pixels; first calculating means for calculating a difference between an average signal of a first row, first column signal and a first row, second column signal in an area of two rows×two columns and an average signal of a second row, first column signal and a second row, second column signal in the area of two rows×two columns; and second calculating means for calculating a difference between an average signal of a first row, first column signal and a second row, first column signal in the area of two rows×two columns and an average signal of a first row, second column signal and a second row, second column signal in the area of two rows×two columns.

An image pickup apparatus according to another embodiment comprises: a plurality of pixels; a color filter array disposed on the plurality of pixels and having a periodicity of two rows×two columns; and calculating means for calculating two color difference signals from each color filter of two rows×two columns in the color filter array having the periodicity of two rows×two columns.

Other objects and features of the present invention will become more apparent from the following detailed description of embodiments when read in conjunction with the accompanying drawings.

BRIEF DESCRIPTION OF THE DRAWINGS

FIG. 1 shows a pattern of conventional color filters.

FIG. 2 shows another pattern of conventional color filters.

FIG. 3 shows a pattern of color filters according to a first embodiment of the invention.

FIG. 4 is a diagram illustrating a read method according to the first embodiment of the invention.

DETAILED DESCRIPTION OF THE PREFERRED EMBODIMENTS

Figure 5:
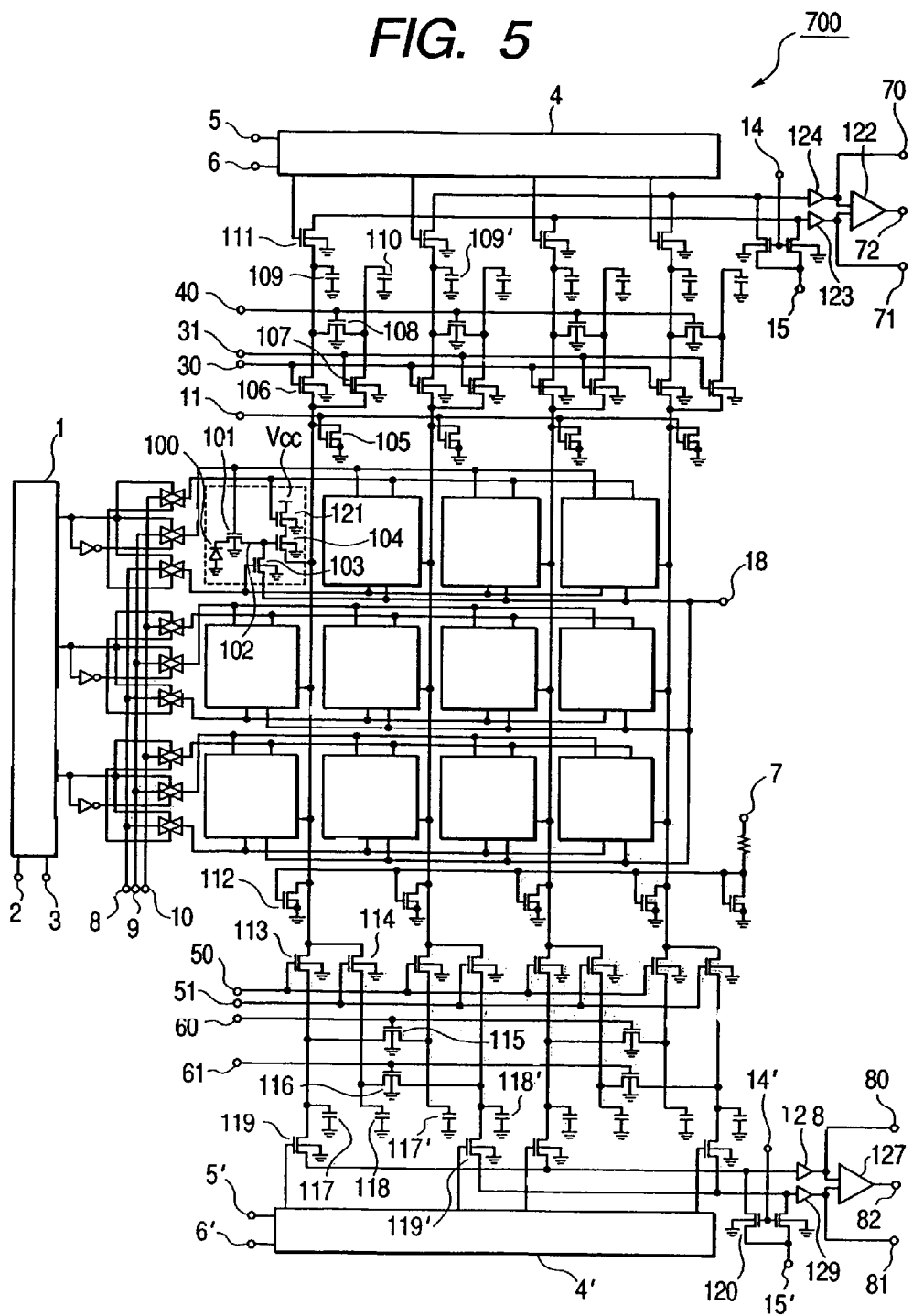
FIG. 5 is a circuit diagram of an image pickup apparatus according to a second embodiment of the invention.

FIG. 3 shows a pattern of color filters according to the first embodiment of the invention. This pattern has a periodicity of two pixels in the horizontal direction and two pixels in the vertical direction. In a pattern of two pixels in the horizontal direction and two pixels in the vertical direction, the first row has G and Ye color filters disposed in this order from the left, and the second row has Cy and Mg color filters disposed in this order from the left. The pattern of color filters may be reversed right and left, or up and down.

The luminance signal Y, blue color difference signal CB, and red color difference signal CR can be calculated respectively from the equations (2) and (3) by using Cy, Ye, Mg, and G signals in various color filter patterns. FIG. 4 shows a pattern of color filters constituted of a fundamental pattern of two pixels in the horizontal direction and two pixels in the vertical direction. With reference to FIG. 4, particular read methods will be described.

1st Read Method:

Color difference signals CB are calculated from adjacent pairs of a series of signals output from image pickup elements, the series being:

$$(G1+Ye1),(Cy1+Mg1),(G2+Ye2),(Cy2+Mg2),$$

$$(G3+Ye3),(Cy3+Mg3),(G4+Ye4),(Cy4+Mg4),\ldots$$

and the color difference signals CD being, for example:

$$CB1=(G1+Ye1)-(Cy1+Mg1)$$

$$CB2=(G2+Ye2)-(Cy2+Mg2)$$

$$CB3=(G3+Ye3)-(Cy3+Mg3)$$

$$CB4=(G4+Ye4)-(Cy4+Mg4).$$

Color difference signals CR are calculated from adjacent pairs of a series of signals output from image pickup elements, the series being:

$$(G1+Cy1),(Ye1+Mg1),(G2+Cy2),(Ye2+Mg2),$$

$$(G3+Cy3),(Ye3+Mg3),(G4+Cy4),(Ye4+Mg4),\ldots$$

and the color difference signals CR being, for example:

$$CR1=(G1+Cy1)-(Ye1+Mg1)$$

$$CR2=(G2+Cy2)-(Ye2+Mg2)$$

$$CR3=(G3+Cy3)-(Ye3+Mg3)$$

$$CR4=(G4+Cy4)-(Ye4+Mg4).$$

With the first read method, the color difference signals CB and CR each can be obtained from two pixels in the horizontal direction and two pixels in the vertical direction, resulting in a high resolution.

2nd Read Method:

A luminance signal Y is calculated from a series of signals output from image pickup elements, the series being:

(G1+Cy1+G3+Cy3),(Ye1+Mg1+Ye3+Mg3), (G2+Cy2+G4+Cy4),(Ye2+Mg2+Ye4+Mg4), . . .

and the luminance signals Y being, for example:

$Y1=(G1+Cy1+G3+Cy3)+(Ye1+Mg1+Ye3+Mg3)$ $Y2=(G2+Cy2+G4+Cy4)+(Ye2+Mg2+Ye4+Mg4).$

With the second read method, one luminance signal Ye is obtained for every two pixels in the horizontal direction. The level of the luminance signal Y is high. The luminance signal Y generated by this method is suitable for an autofocus detecting signal particularly when an object has a high horizontal resolution such as a fine vertical stripe pattern and has a low luminance.

3rd Read Method:

A luminance signal Y is calculated from a series of signals output from image pickup elements, the series being:

(G1+Ye1+G2+Ye2),(Cy1+Mg1+Cy2+Mg2), (G3+Ye3+G4+Ye4),(Cy3+Mg3+Cy4+Mg4), . . .

and the luminance signals Y being, for example:

$Y1=(G1+Ye1+G2+Ye2)+(Cy1+Mg1+Cy2+Mg2)$ $Y2=(G3+Ye3+G4+Ye4)+(Cy3+Mg3+Cy4+Mg4).$

With the third read method, one luminance signal Ye is obtained for every two pixels in the vertical direction. The level of the luminance signal Y is high in the vertical direction. The luminance signal Y generated by this method is suitable for an autofocus detecting signal particularly when an object has a high horizontal resolution such as a fine horizontal stripe pattern.

4th Read Method:

Color difference signals CB are calculated from adjacent pairs of a series of signals output from image pickup elements, the series being:

(G1+Ye1),(Cy1+Mg1),(G2+Ye2),(Cy2+Mg2), . . .

and the color difference signals CB being, for example:

$CB1=(G1+Ye1)-(Cy1+Mg1)$ $CB2=(G2+Ye2)-(Cy2+Mg2).$

Color difference signals CR are calculated from adjacent pairs of a series of signals output from image pickup elements, the series being:

(G3+Cy3),(Ye3+Mg3),(G4+Cy4),(Ye4+Mg4), . . .

and the color difference signals CR being, for example:

$CR1=(G3+Cy3)-(Ye3+Mg3)$ $CR2=(G4+Cy4)-(Ye4+Mg4).$

With the fourth read method, a color difference line sequential signal can be obtained. The fourth read method is suitable for a moving image object, because the number of read signals is a half of the first read method.

5th Read Method:

Color difference signals CB are calculated from adjacent pairs of a series of signals output from image pickup elements, the series being:

(G1+Ye1),(Cy1+Mg1),(G2+Ye2),(Cy2+Mg2), . . .

and the color difference signals CB being, for example:

$CB1=(G1+Ye1)-(Cy1+Mg1)$ $CB2=(G2+Ye2)-(Cy2+Mg2).$

Color difference signals CR are calculated from adjacent pairs of a series of signals output from image pickup elements, the series being:

(G2+Cy2),(Ye2+Mg2),(G4+Cy4),(Ye4+Mg4), . . .

and the color difference signals CR being, for example:

$CR1=(G2+Cy2)-(Ye2+Mg2)$ $CR2=(G4+Cy4)-(Ye4+Mg4).$

The fifth read method is suitable for a moving image object.

An image signal can be read at high speed because the number of read color difference signals of pixels is a half of the first read method.

6th Read Method:

Color difference signals CB are calculated by the method similar to the fifth read method.

Color difference signals CR are calculated from adjacent pairs of a series of signals output from image pickup elements, the series being:

(G1,Cy1),(Ye1,Mg1),(G3,Cy3),(Ye3,Mg3), . . .

and the color difference signals CR being, for example:

$CR1=(G1+Cy1)-(Ye1+Mg1)$ $CR2=(G3+Cy3)-(Ye3+Mg3).$

The sixth read method is suitable for a moving image object.

An image signal can be read at high speed because the number of read color difference signals of pixels is a half of the first read method.

7th Read Method:

Color difference signals CB are calculated by the method similar to the fifth read method.

Color difference signals CR are calculated from adjacent pairs of a series of signals output from image pickup elements, the series being:

(G1,Cy1),(Ye1,Mg1),(G2,Cy2),(Ye2,Mg2), . . .

and the color difference signals CR being, for example:

$CR1=(G1+Cy1)-(Ye1+Mg1)$ $CR2=(G2+Cy2)-(Ye2+Mg2).$

The sixth read method is suitable for a moving image object.

An image signal can be read at high speed because the number of read color difference signals of pixels is half of the first read method.

The color difference signals CB and CR are obtained from the same area.

8th to 11th Read Methods:

Color difference signals CB are calculated from adjacent pairs of a series of signals output from image pickup elements, the series being:

(G1+Ye1),(Cy1+Mg1),(G3+Ye3),(Cy3+Mg3), . . .

and the color difference signals CB being, for example:

$$CB1=(G1+Ye1)-(Cy1+Mg1)$$

$$CB2=(G3+Ye3)-(Cy3+Mg3).$$

The color difference signals CR are calculated by the similar method to the fourth to seventh read methods. The eighth to eleventh read methods are suitable for a moving image object.

An image signal can be read at high speed because the number of read color difference signals of pixels is half of the first read method.

12th Read Method:

Color difference signals CB are calculated from adjacent pairs of a series of signals output from image pickup elements, the series being:

(G1+Ye1),(Cy1+Mg1), . . .

and the color difference signal CB being, for example:

$$CB1=(G1+Ye1)-(Cy1+Mg1)$$

Color difference signals CR are calculated from adjacent pairs of a series of signals output from image pickup elements, the series being:

(G4,Cy4),(Ey4,Mg4), . . .

and the color difference signal CR being, for example:

$$CR1=(G4+Cy4)-(Ye4+Mg4)$$

The twelfth method is suitable for a moving image object.

An image signal can be read at high speed because the number of read color difference signals of pixels is a quarter of the first read method.

13th Read Method:

Luminance signals Y are calculated from adjacent pairs of a series of signals output from image pickup elements, the series being:

(G1+Ye1),(Cy1+Mg1),(G2+Ye2),(Cy2+Mg2), (G3+Ye3),(Cy3+Mg3),(G4+Ye4),(Cy4+Mg4), . . .

and the luminance signals Y being, for example:

$$Y1=(G1+Ye1)+(Cy1+Mg1)$$

$$Y2=(G2+Ye2)+(Cy2+Mg2)$$

$$Y3=(G3+Ye3)+(Cy3+Mg3)$$

$$Y4=(G4+Ye4)+(Cy4+Mg4).$$

14th Read Method:

Luminance signals Y are calculated from adjacent pairs of a series of signals output from image pickup elements, the series being:

(G1+Cy1),(Ye1+Mg1),(G2+Cy2),(Ye2+Mg2), (G3+Cy3),(Ye3+Mg3),(G4+Cy4),(Ye4+Mg4), . . .

and the luminance signals Y being, for example:

$$Y1=(G1+Cy1)+(Ye1+Mg1)$$

$$Y2=(G2+Cy2)+(Ye2+Mg2)$$

$$Y3=(G3+Cy3)+(Ye3+Mg3)$$

$$Y4=(G4+Cy4)+(Ye4+Mg4).$$

The above read methods may be used while pixels are read by thinning them in the unit of a fundamental pattern or a plurality of fundamental pattern to thereby speed up a read operation.

Next, a circuit structure realizing the read method of the first embodiment using CMOS sensors as an example of image pickup elements, according to the second embodiment of the invention, will be described.

FIG. 5 is a circuit diagram showing the structure of a CMOS sensor of the second embodiment. In this embodiment, the CMOS sensor includes: a first output series for outputting a difference between an average value of detection light amounts of two pixels adjacent in the vertical direction in one column and an average value of detection light amounts of two pixels adjacent in the vertical direction in the next column; and a second output series for outputting a difference between an average value of detection light amounts of two pixels adjacent in the horizontal direction in one row and an average value of detection light amounts of two pixels adjacent in the horizontal direction in the next row. Therefore, the CMOS sensor of this embodiment can use the first read method.

Referring to FIG. 5, reference numeral 1 represents a vertical scan circuit for generating an enable signal which enables a control signal of each row, the enable signal sequentially becoming active in the vertical direction. Reference numeral 100 represents a photodiode serving as a photodetector for converting incidence light into electric charges. Reference numeral 101 represents a transfer transistor for transferring the electric charges generated by the photodiode 100 to a floating diffusion region 101, 102 which temporarily stores the transferred electric charges. Reference numeral 103 represents a reset transistor for discharging electric charges accumulated in the gate of an amplifier transistor 104. Reference numeral 121 represents a switching transistor. The elements 100 to 104, and 121 constitute one pixel. Reference numeral 112 represents a constant current source transistor which is activated by a voltage applied to a terminal 7. Reference numeral 105 represents a transistor for discharging electric charges in capacitors 109, 110, 117, and 118. Reference numeral 106 represents a current distribution division transistor for connecting the source of the transistor 104 to the capacitor 109. Reference numeral 107 represents a current distribution transistor for connecting the source of the transistor 104 to the capacitor 110. The capacitors 109 and 110 function as a line memory which is charged by a voltage supplied from the transistor 104. Reference numeral 108 represents an averaging transistor for averaging the electric charges in the capacitors 109 and 110. Reference numeral 111 represents a switching transistor for applying a voltage of the line memory 109 to a buffer 123 at the front stage of a differential amplifier 122 which amplifies a difference between voltages across the capacitors 109 and 109'. Reference numeral 113 represents a switching transistor for connecting the source of the transistor 104 to a capacitor 117. Reference numeral 114 represents a switching transistor for connecting the source of the transistor 104 to a capacitor, 118. The capacitors 117 and 118 are charged by a current supplied from the source of the transistor 104. Reference numeral 115 represents a switching transistor for controlling to average the electric charges stored in the capacitors 117 and 117'. Reference numeral 116 represents a switching transistor for controlling to average the electric charges stored in the capacitors 118 and 118'. Reference numeral 119 represents a switching transistor for supplying a voltage of the line memory 117 to a buffer 129 at the front stage of a differential amplifier 127 which amplifies a difference between voltages across the capacitors 117 and 118'. The constant current source transistor 112 is activated in the unit of a row, and paired with the transistor 104 to constitute an amplifier.

Figure 6:
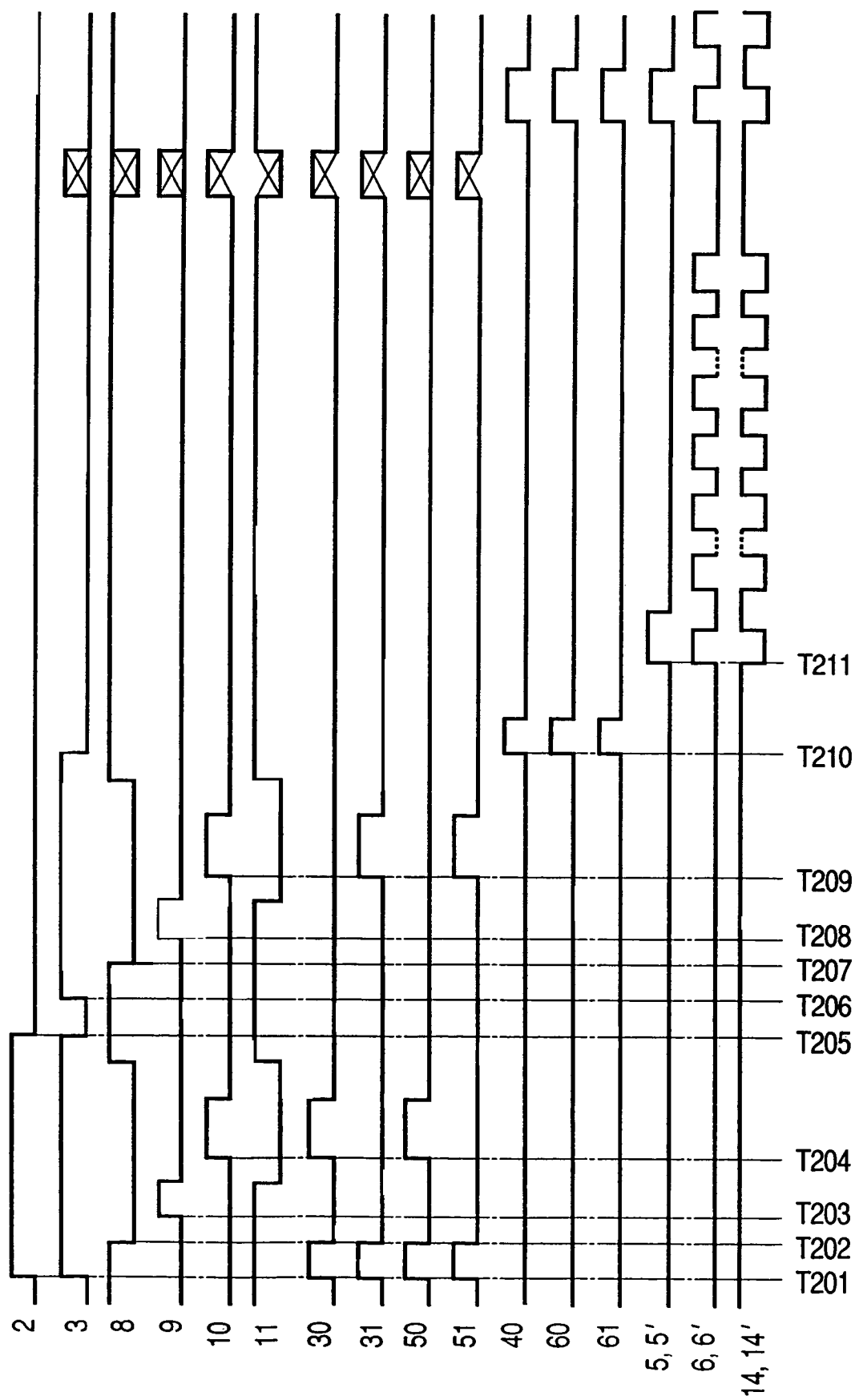
FIG. 6 is a timing chart illustrating the operation of the image pickup apparatus shown in FIG. 5.

FIG. 6 is a timing chart illustrating an operation of the CMOS sensor shown in FIG. 5 With reference to FIGS. 5 and 6, the operation of the CMOS sensor shown in FIG. 5 will be described.

At timing T201, a pulse applied to a terminal 11 takes a high state, and pulses applied to M terminals 30, 31, 50, and 51 take the high state. Therefore, the line memories 109, 110, 117, and 118 are reset to initial potentials. At the same time, a start pulse applied to a terminal 2 of the vertical scan circuit 1 and a scan pulse applied to a terminal 3 take the high level, so that the vertical scan circuit 1 starts scanning to select the first row. A high level pulse is applied to a terminal 8 to reset the floating diffusion regions of the pixel area. At timing T202, a reset pulse at the terminal 8 falls so that the floating diffusion regions of first row pixels are made in an electrically floating state. At timing T203, a high level pulse is applied to a terminal 9 so that electric charges are transferred from photodiodes of the first row to the floating diffusion regions. At timing T204, a high level pulse is applied to terminals 10, 30, and 50 so that a voltage proportional to light amounts detected with the photodetectors of the first row is read to the capacitors 109 and 117 via the amplifier 104. At timing T205, the vertical scan pulse 3 falls. At timing T206, the vertical scan pulse 3 again rises to select the second row. At timing T207, a reset pulse falls so that the floating diffusion regions of pixels of the second row are made in an electrically floating state. At timing T208, similar to timing T203, a high level pulse is applied to the terminal 9 so that electric charges are transferred from photodiodes of the second row to the floating diffusion regions. At timing T209, similar to timing T204, a high level pulse is applied to terminals 10, 30, and 51 so that a voltage proportional to light amounts detected with the photodetectors of the second row is read to the capacitors 110 and 118 via the amplifier 104 of the second row. At timing T210, a high level pulse is applied to terminals 40, 60, and 61 to average the electric charges on the line memories. At timing T211, a horizontal scan circuit 4 starts scanning so that averaged voltages are sequentially applied in the horizontal direction to the differential amplifiers 122 and 127. The differential amplifiers 122 and 127 output a blue color difference signal CB and a red color difference signal CR. By connecting adders (not shown) made of an operational amplifier or the like to the terminals 70 and 71 and to the terminals 80 and 81, luminance signals can be output.

If the averaging operation by the averaging transistor 108 is not performed and the signals of all rows are temporarily stored in the capacitor 109, an output signal of each pixel in the odd column can be obtained from the output terminal 71, and an output signal of each pixel in the even column can be obtained from the output terminal 70.

Figure 7:
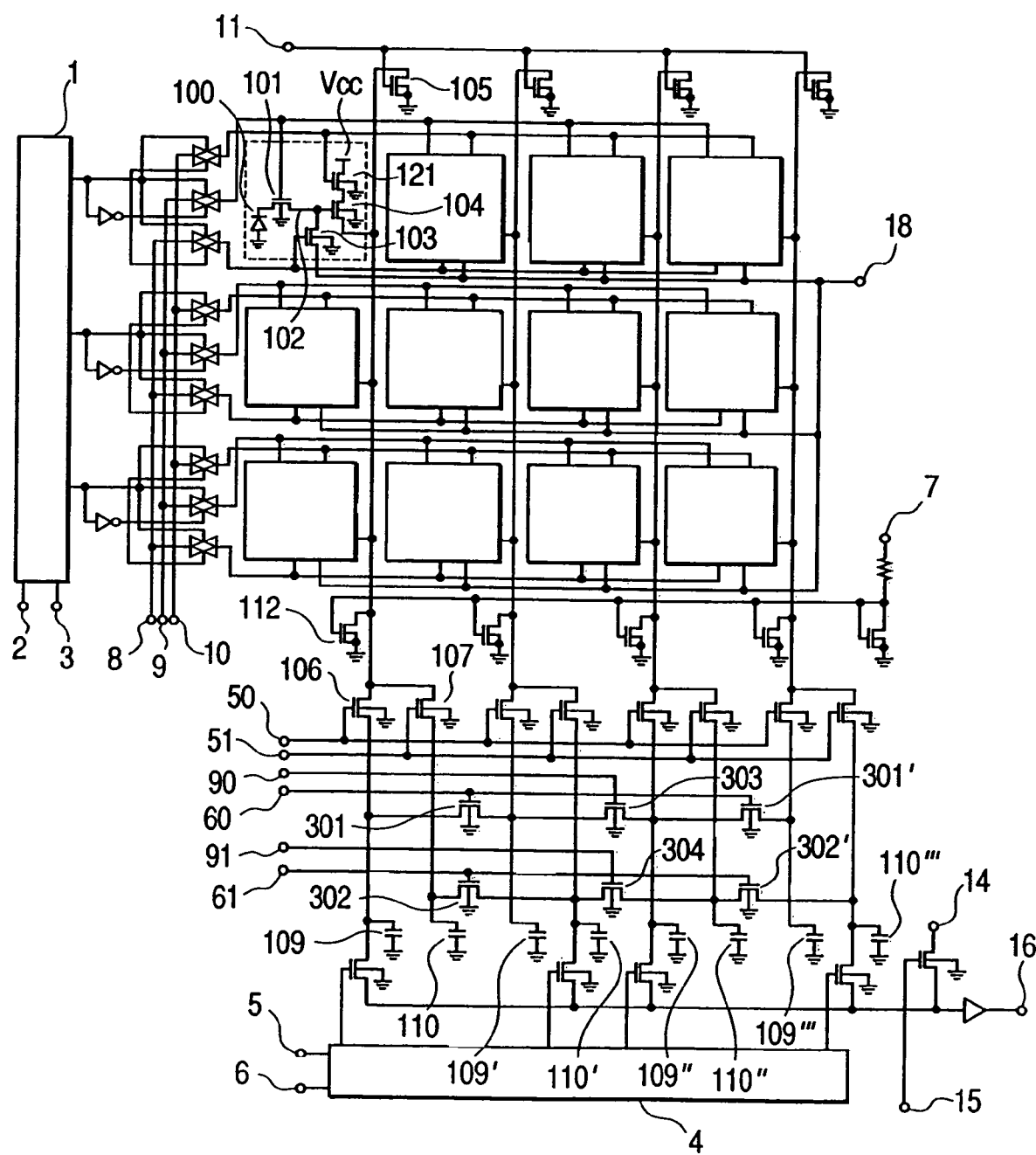
FIG. 7 is a circuit diagram of an image pickup apparatus according to a third embodiment of the invention.

FIG. 7 is a circuit diagram showing the structure of a CMOS sensor of the third embodiment. In this embodiment, the CMOS sensor includes an output series for outputting an average value of detection light amounts of two pixels adjacent in the horizontal direction or an average of detection light amounts of four pixels adjacent in the horizontal direction. Therefore, the CMOS sensor of this embodiment can use the third read method by summing the two outputs of the CMOS sensor.

In FIG. 7, like elements to those similar to the CMOS sensor of the second embodiment are represented by using identical reference numerals, and the duplicated description thereof is omitted. Reference numeral 301 represents a switching transistor for controlling to average electric charges accumulated in capacitors 109 and 109'. Reference numeral 302 represents a switching transistor for controlling to average electric charges accumulated in capacitors 110 and 110'. Reference numeral 301' represents a switching transistor for controlling to average electric charges accumulated in capacitors 109" and 109'". Reference numeral 302' represents a switching transistor for controlling to average electric charges accumulated in capacitors 110" and 110'". Reference numeral 303 represents a switching transistor for controlling to average electric charges accumulated in the capacitors 109' and 109". Reference numeral 304 represents a switching transistor for controlling to average electric charges accumulated in the capacitors 110' and 110". If the switching transistors 301, 301', and 303 are operated synchronously, the electric charges stored in the capacitors 109, 109', 109", and 109'" are averaged. For example, if after or when the switching transistors 301 and 301' are turned on, the switching transistor 303 is turned on, these transistors average the electric charges stored in the capacitors 109, 109', 109", and 109'". If the switching transistors 302, 302', and 304 are operated synchronously, these transistors average the electric charges stored in the capacitors 110, 110', 110", and 110'". Namely, if after or when the switching transistors 302 and 304' are turned on, the switching transistor 304 is turned on, these transistors average the electric charges stored in the capacitors 110, 110', 110", and 110'".

Figure 8:
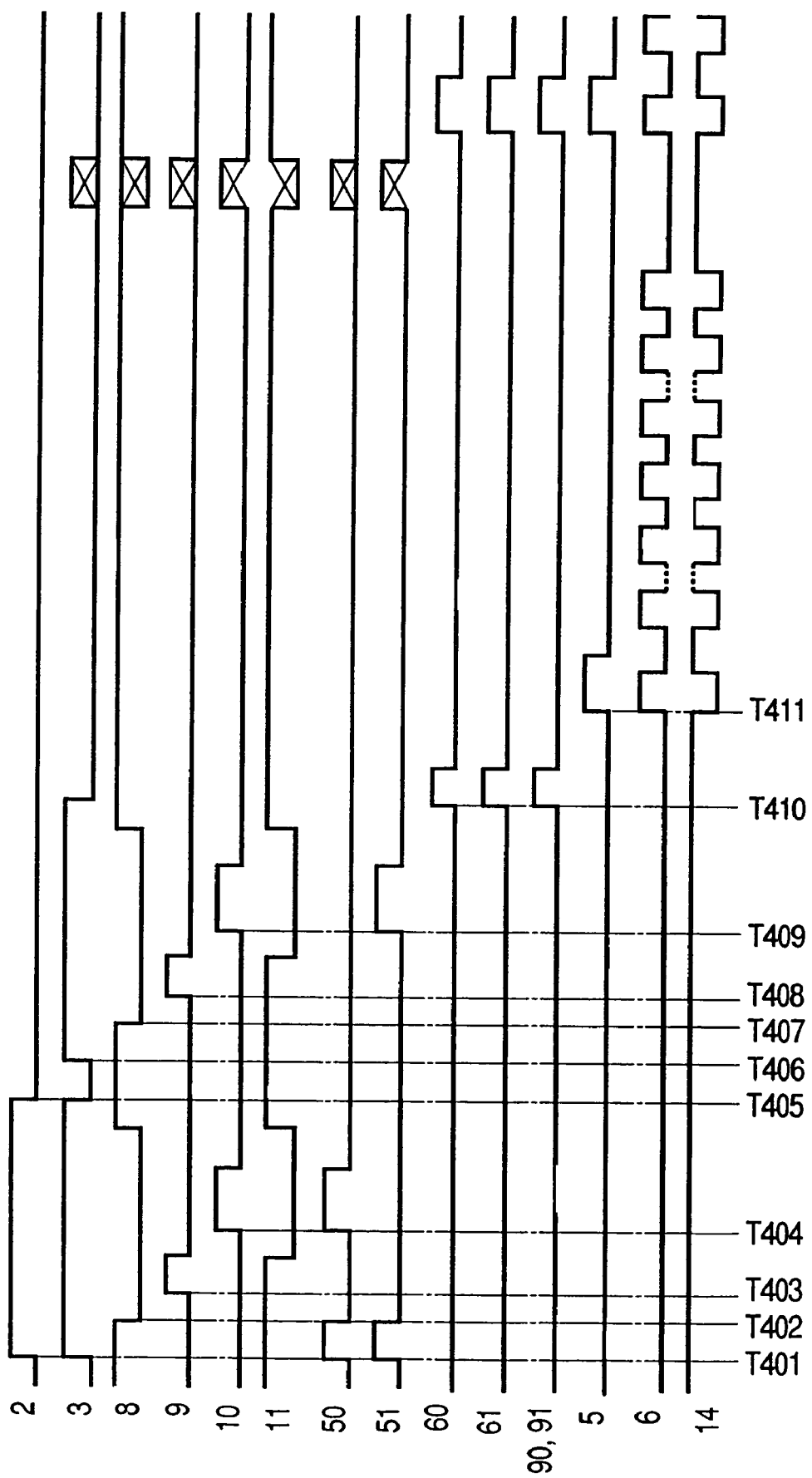
FIG. 8 is a timing chart illustrating the operation of the image pickup apparatus shown in FIG. 6.

FIG. 8 is a timing chart illustrating an operation of the CMOS sensor shown in FIG. 7. With reference to FIGS. 7 and 8, the operation of the CMOS sensor shown in FIG. 7 will be described.

At timing T401, a start pulse applied to a terminal 2 of the vertical scan circuit 1 and a scan pulse applied to a terminal 3 take the high level, so that the vertical scan circuit 1 starts scanning to select the first row. A high level pulse is applied to a terminal 8 to reset the floating diffusion regions of the pixel area. At timing T402, a reset pulse at the terminal 8 falls so that the floating diffusion regions of first row pixels are made in an electrically floating state. At timing T403, a high level pulse is applied to a terminal 9 so that electric charges in the photodetectors of the first row are transferred to the floating diffusion regions. At timing T404, a high level pulse is applied to terminals 10 and 50 so that a voltage proportional to light amounts detected with the photodetectors of the first row is read to the capacitor 109 via the amplifier 104. At timing T405, the vertical scan pulse 3 rises. At timing T406, the vertical scan pulse 3 again falls to select the second row. At timing T407, a reset pulse falls so that the floating diffusion regions of pixels of the second row are made in an electrically floating state. At timing T408, similar to timing T403, a high level pulse is applied to the terminal 9 so that electric charges are transferred from photodiodes of the second row to the floating diffusion regions. At timing T409, similar to timing T404, a high level pulse is applied to terminals 10, and 51 so that a voltage proportional to light amounts detected with the photodetectors of the second row is read to the capacitor 110 via the amplifier 104 of the second row. At timing T410, a high level pulse is applied to terminals 60, 61, 90, and 91 to average the electric charges in the capacitors 109, 109', 109", and 109'" on the line memories and to average the electric charges in the capacitors 110, 110', 110", and 110'" on the line memories. At timing T411, a horizontal scan circuit 4 starts scanning so that averaged voltages are sequentially output in the horizontal direction. Since a luminance signal is output in this embodiment, only one output terminal 16 is used. If a plurality of output terminals like those shown in FIG. 7 are used, color difference signals can be obtained.

Figure 9:
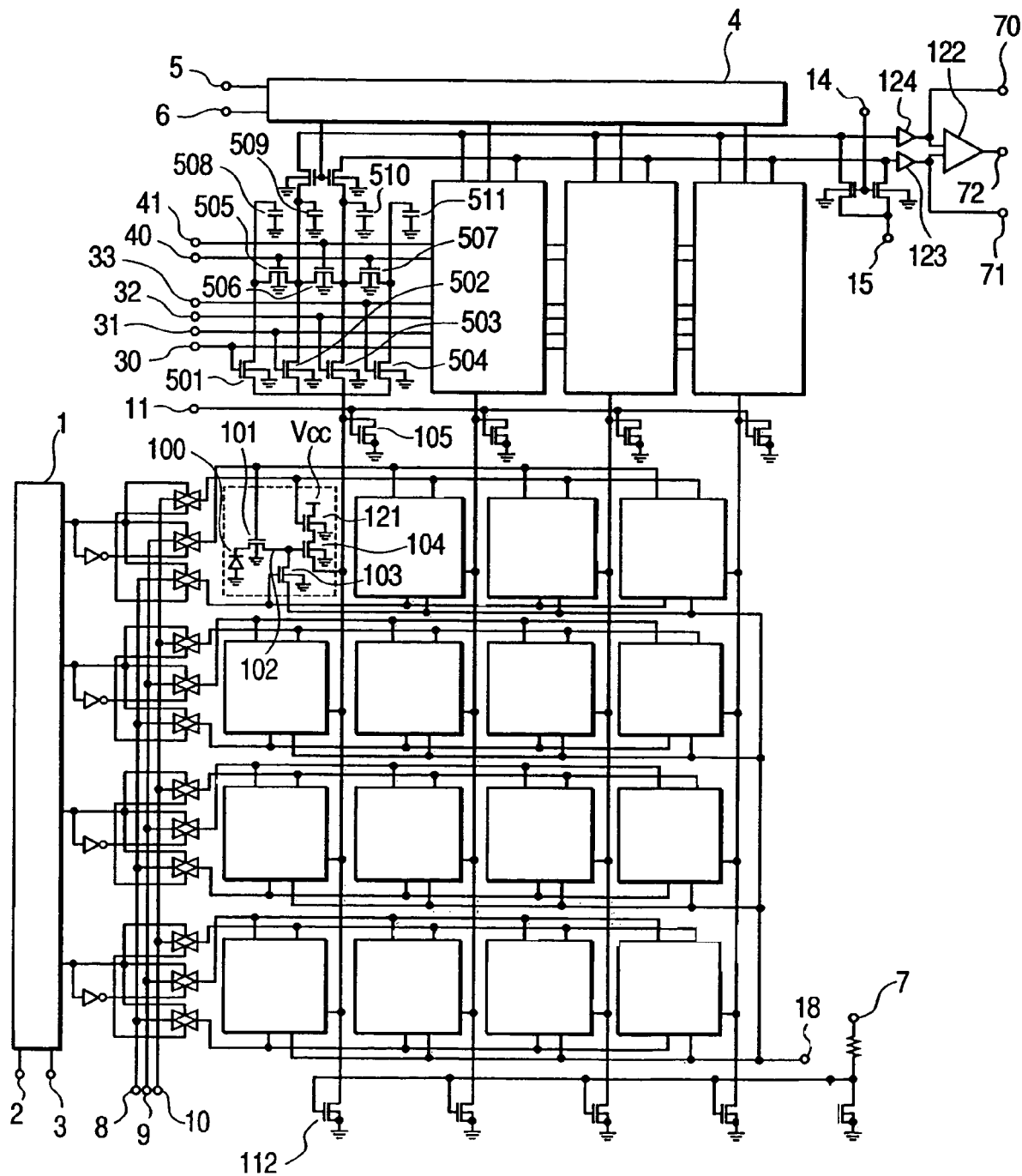
FIG. 9 is a circuit diagram of an image pickup apparatus according to a fourth embodiment of the invention.

FIG. 9 is a circuit diagram showing the structure of a CMOS sensor of the fourth embodiment. In this embodiment, the CMOS sensor includes an output series for outputting an average value of detection light amounts of two pixels adjacent in the vertical direction or an average of detection light amounts of four pixels adjacent in the vertical direction. Therefore, the CMOS sensor of this embodiment can use the second read method by summing the two outputs of the CMOS sensor.

In FIG. 9, like elements to those similar to the CMOS sensor of the third embodiment are represented by using identical reference numerals, and the duplicated description thereof is omitted. Reference numerals 501, 502, 503, and 504 represent current distribution transistors for distributing current supplied from a transistor to capacitors 508, 509, 510, and 511. The capacitor 508 stores signals from first row photodetectors, the capacitor 509 stores signals from second row photodetectors, the capacitor 510 stores signals from third row photodetectors, and the capacitor 511 stores signals from fourth row photodetectors. Reference numeral 505 represents a switching transistor for controlling to average electric charges accumulated in the capacitors 508 and 509. Reference numeral 506 represents a switching transistor for controlling to average electric charges accumulated in the capacitors 509 and 510. Reference numeral 507 represents a switching transistor for controlling to average electric charges accumulated in the capacitors 510 and 511. If the switching transistors 505, 506, and 507 are operated synchronously, the electric charges stored in the capacitors 508, 509, 510, and 511 are averaged. For example, if after or when the switching transistors 505 and 507 are turned on, the switching transistor 506 is turned on, these transistors average the electric charges stored in the capacitors 508, 509, 510, and 511.

Figure 10:
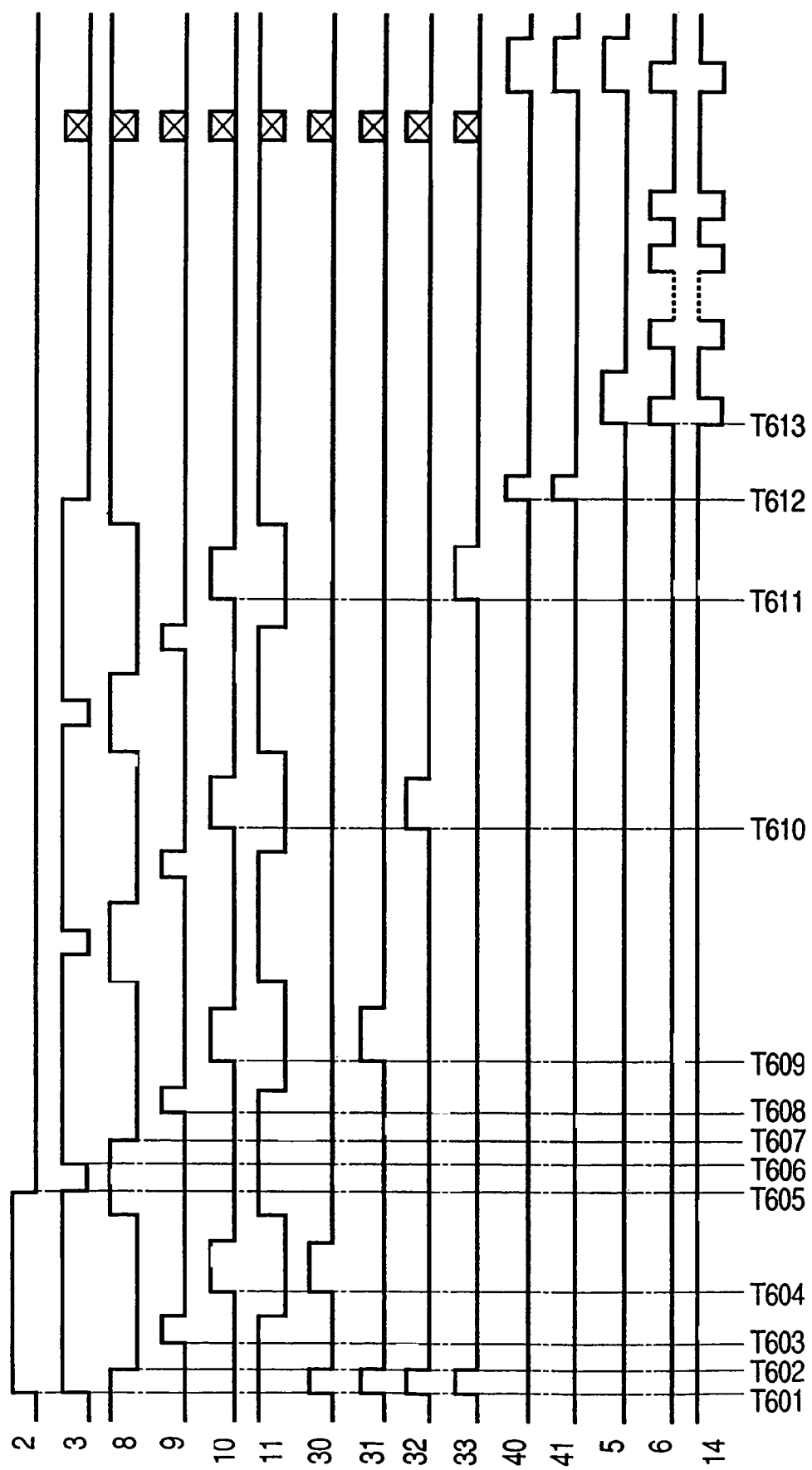
FIG. 10 is a timing chart illustrating the operation of the image pickup apparatus shown in FIG. 9.

FIG. 10 is a timing chart illustrating an operation of the CMOS sensor shown in FIG. 9. With reference to FIGS. 9 and 10, the operation of the CMOS sensor shown in FIG. 9 will be described.

At timing T601, a start pulse applied to a terminal 2 of the vertical scan circuit 1 and a scan pulse applied to a terminal 3 take the high level, so that the vertical scan circuit 1 starts scanning to select the first row. A high level pulse is applied to a terminal 8 to reset the floating diffusion regions of the pixel area. At timing T602, a reset pulse at the terminal 8 falls so that the floating diffusion regions of first row pixels are made in an electrically floating state. At timing T603, a high level pulse is applied to a terminal 9 so that electric charges in the photodetectors of the first row are transferred to the floating diffusion regions. At timing T604, a high level pulse is applied to terminals 10 and 30 so that a voltage proportional to light amounts detected with the photodetectors of the first row is read to the capacitor 508. At timing T605, the vertical scan pulse 3 rises. At timing T606, the vertical scan pulse 3 again rises to select the second row. At timing T607, a reset pulse falls so that the floating diffusion regions of pixels of the second row are made in an electrically floating state. At timing T608, similar to timing T603, a high level pulse is applied to the terminal 9 so that electric charges are transferred from photodiodes of the second row to the floating diffusion regions. At timing T609, similar to timing T604, a high level pulse is applied to terminals 10, and 31 so that a voltage proportional to light amounts detected with the photodetectors of the second row is read to the capacitor 509. Similarly at timing T610, a high level pulse is applied to terminals 10 and 32 so that a voltage proportional to light amounts detected with the photodetectors of the third row is read to the capacitor 510. Similarly at timing T611, a high level pulse is applied to terminals 10 and 33 so that a voltage proportional to light amounts detected with the photodetectors of the fourth row is read to the capacitor 511. At timing T612, a high level pulse is applied to the terminals 40 and 41 to average the electric charges in the capacitors 508, 509, 510, and 511 on the line memories. At timing T613, a horizontal scan circuit 4 starts scanning so that averaged voltages are sequentially output in the horizontal direction. Voltages proportional to average values of light amounts detected with the photodetectors of the first to fourth rows are sequentially output from an output terminal 70.

If the averaging operation by the switching transistor 506 is not performed, an average value of the first and second columns may be output from the output terminal 70 and an average value of the third and fourth columns may be output from an output terminal 71. A difference between the average value of the first and second columns and the average value of the third and fourth columns may be output from an output terminal 72.

In the operation described with reference to FIGS. 5 to 10, a reset voltage at the floating diffusion regions may be read to another line memory, prior to reading image signals of pixels. In this case, by using a difference between the reset voltage and the image signal, a variation of output voltages to be caused by a variation of threshold voltages of transistors 104 can be eliminated. Therefore, an image signal with a high S/N ratio can be obtained which does not contain noise components to be generated by a variation of image signals caused by a variation of amounts of light detected with photodetectors.

Vertical/horizontal scanning may be performed by thinning pixels in the unit of one block or a plurality of blocks so that more compressed image signals can be obtained.

Other photoelectric conversion elements may be used to obtain similar advantages of the above embodiments.

In the above embodiments, a CMOS sensor is used as an example of image pickup elements. Other image pickup elements such as CCD and SIT may also be used.

In the above embodiments, color filters of four colors including yellow Ye, magenta Mg, cyan Cy, and green G are used. Other color filters may also be used if they can obtain a luminance signal and color difference signals.

Figure 11:
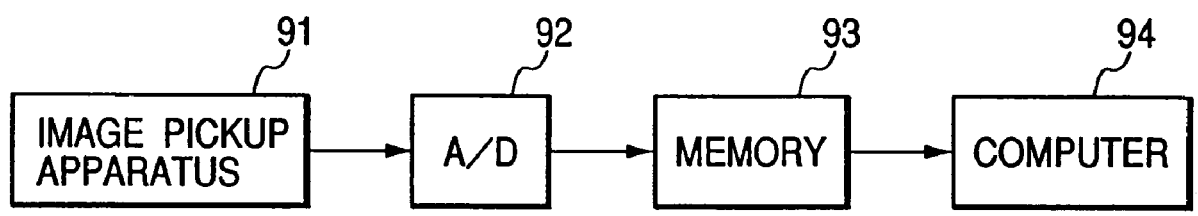
FIG. 11 is a diagram showing an image pickup system with an image pickup apparatus, according to a fifth embodiment of the invention.

FIG. 11 is a block diagram showing the structure of an image pickup system with an image pickup apparatus, according to the fifth embodiment of the invention.

Referring to FIG. 11, signals from pixels of an image pickup apparatus 91 such as a CMOS sensor are supplied directly to an A/D converter 92, without processing the signals such as addition calculation to obtain color difference signals and a luminance signal. After the signals are converted by the A/D converter 92 into digital signals, they are stored in a memory 93. A computer 94 performs necessary calculations for digital signals stored in the memory 93 to obtain a luminance signal and color difference signals. Software for running the computer 94 may be stored in a storage medium storing programs. The storage medium storing such programs may be a floppy disk, a hard disk, an optical disk, a magneto-optical disk, a CD-ROM, a magnetic tape, a semiconductor memory, and the like.

As described so far, according to the embodiments, a color image signal with color difference signals having a high resolution both in the horizontal and vertical directions can be obtained, for example by using the first read method.

According to the embodiments, there are various read modes relative to the same color filer pattern. Accordingly, the embodiments can be applied to a multi-mode such as a mode of outputting an image signal at high speed which signal can be used for simple color display, autofocus, white balance adjustment and a mode of outputting an image signal having a high resolution.

Many widely different embodiments of the present invention may be constructed without departing from the spirit and scope of the present invention. It should be understood that the present invention is not limited to the specific embodiments described in the specification, except as defined in the appended claims.

What is claimed is:

1. A CMOS sensor comprising a plurality of pixels arranged on a semiconductor substrate, each pixel including a photoelectric converting portion for generating a color image signal based on light incident on the photoelectric converting portion through a color filter in an array of four colors, wherein the color filter array has a periodicity of two rows times two columns, colors of four color filters in a periodical unit of two rows times two columns are all different from each other, the four color filters include a G filter transmitting only green light in the visible light range, a Ye filter intercepting only blue light in the visible light range, a Mg filter intercepting only green light in the visible light range and a Cy filter intercepting only red light in the visible light range, the G filter is disposed in a vertical direction adjacent to the Cy filter, the G filter is disposed in a horizontal direction adjacent to the Ye filter, and the Mg filter is disposed in the horizontal direction adjacent to the Cy filter and in the vertical direction adjacent to the Ye filter, and wherein the CMOS sensor has inside thereof capacitors respectively holding signals from two pixels adjacent to each other in a horizontal direction, a switch adding together the signals held in the capacitors, and a differential amplifier arranged on the semiconductor substrate for providing a blue color difference signal by differentiating the added signals between rows adjacent to each other in a vertical direction, and capacitors respectively holding signals from two of the plurality of pixels adjacent to each other in the vertical direction, a switch adding together the signals held in the capacitors, and a differential amplifier arranged on the semiconductor substrate for providing a red color difference signal by differentiating the added signals between columns adjacent to each other in the horizontal direction.

2. The color image pickup apparatus according to claim 1, further comprising means for reading an addition signal of all signals in an area of four rows×one column.

3. The color image pickup apparatus according to claim 1, further comprising means for reading an addition signal of all signals in an area of one row×four columns.

* * * * *